United States Patent
Oka et al.

(10) Patent No.: US 10,279,503 B2
(45) Date of Patent: May 7, 2019

(54) CUTTING PEN, CUTTING PLOTTER, AND BLADE EXTENSION AMOUNT CONTROL METHOD OF CUTTING PLOTTER

(71) Applicant: Graphtec Corporation, Kanagawa (JP)

(72) Inventors: Ryoichi Oka, Kanagawa (JP);
Kazuhiro Watanabe, Kanagawa (JP);
Tsutomu Ohira, Kanagawa (JP)

(73) Assignee: GRAPHTEC CORPORATION, Kanagawa (JP)

( * ) Notice: Subject to any disclaimer, the term of this patent is extended or adjusted under 35 U.S.C. 154(b) by 239 days.

(21) Appl. No.: 15/457,623

(22) Filed: Mar. 13, 2017

(65) Prior Publication Data

US 2017/0259450 A1    Sep. 14, 2017

(30) Foreign Application Priority Data

Mar. 14, 2016 (JP) ................. 2016-049225
Mar. 14, 2016 (JP) ................. 2016-049226

(51) Int. Cl.
*B26D 7/02* (2006.01)
*B26F 1/38* (2006.01)
(Continued)

(52) U.S. Cl.
CPC ............ *B26F 1/3813* (2013.01); *B26D 3/10* (2013.01); *B26D 5/005* (2013.01); *B26D 7/025* (2013.01);
(Continued)

(58) Field of Classification Search
CPC ......... B26F 1/3813; B26D 5/005; B26D 3/10; B26D 2007/2678; B65H 35/0086
See application file for complete search history.

(56) References Cited

U.S. PATENT DOCUMENTS 3,731,648 A * 5/1973 Gerber ............... B26D 7/27
                                                         118/38
4,448,808 A * 5/1984 Pearl .................. A41H 3/08
                                                         427/208.6
(Continued)

FOREIGN PATENT DOCUMENTS

CN      201881419 U      6/2011
CN      105108800 A      12/2015
(Continued)

OTHER PUBLICATIONS

Search Report in European Application No. 17 16 0403 dated Jul. 12, 2017.
(Continued)

*Primary Examiner* — Sean M Michalski
(74) *Attorney, Agent, or Firm* — Womble Bond Dickinson (US) LLP

(57) ABSTRACT

A cutting pen includes a cutting pen main body including a blade projecting from one end, a medium pressing member inserted into the cutting pen main body to be movable in a state in which a cap portion projects from the one end of the cutting pen main body, and a knock mechanism configured to change the position of the medium pressing member with respect to the cutting pen main body stepwise by causing the medium pressing member to repetitively reciprocally move with respect to the cutting pen main body.

22 Claims, 10 Drawing Sheets

(51) Int. Cl.
  *B26D 3/10* (2006.01)
  *B26D 5/00* (2006.01)
  *B26D 7/26* (2006.01)
  *B65H 5/06* (2006.01)
  *B65H 35/00* (2006.01)
  *G05B 19/18* (2006.01)
  *B26D 7/14* (2006.01)

(52) U.S. Cl.
  CPC ............ *B26D 7/14* (2013.01); *B26D 7/2628* (2013.01); *B65H 5/062* (2013.01); *B65H 35/0086* (2013.01); *G05B 19/182* (2013.01); *B26D 2007/2678* (2013.01)

(56) References Cited

U.S. PATENT DOCUMENTS

| | | | | |
|---|---|---|---|---|
| 4,572,103 | A * | 2/1986 | Engel | ............ B05C 5/02 118/410 |
| 4,584,964 | A * | 4/1986 | Engel | ............ H05K 3/0091 118/610 |
| 5,033,700 | A * | 7/1991 | Robbins | ............ D06B 11/0059 248/49 |
| 5,035,018 | A * | 7/1991 | Robbins | ............ D06B 11/0059 8/150 |
| 7,615,128 | B2 * | 11/2009 | Mikkelsen | ............... B26D 7/34 156/250 |
| 2010/0104347 | A1 | 4/2010 | Furukawa et al. | |
| 2014/0260872 | A1 | 9/2014 | Niizeki | |

FOREIGN PATENT DOCUMENTS

| | | |
|---|---|---|
| DE | 19508587 A1 | 9/1996 |
| JP | H11-010595 A | 1/1999 |
| JP | 2013-078813 A | 5/2013 |
| JP | 2014104525 A | 6/2014 |
| JP | 2014-176936 A | 9/2014 |

OTHER PUBLICATIONS

Office Action received for Chinese Patent Application No. 201710148900.4, dated Aug. 1, 2018, 8 pages (3 pages of English Translation and 5 pages of Office Action).

Office Action received for Chinese Patent Application No. 201710148404.9, dated Aug. 1, 2018, 8 pages (3 pages of English Translation and 5 pages of Office Action).

* cited by examiner

CUTTING PEN, CUTTING PLOTTER, AND BLADE EXTENSION AMOUNT CONTROL METHOD OF CUTTING PLOTTER

BACKGROUND OF THE INVENTION

The present invention relates to a cutting pen for cutting a cutting target medium, a cutting plotter, and a blade extension amount control method of a cutting plotter.

To cut a sheet-shaped cutting target medium into a predetermined shape, a cutting plotter as disclosed in, for example, Japanese Patent Laid-Open No. 2013-78813 (to be referred to as "literature 1" hereinafter) or Japanese Patent Laid-Open No. 11-10595 (to be referred to as "literature 2" hereinafter) is used. A cutting plotter of this type employs an arrangement that cuts a cutting target medium using a cutting pen with a blade projecting.

A cutting pen disclosed in literature 1 includes a cylindrical cutting pen main body, a cutter provided at the center of the cutting pen main body, and a cylindrical cap with a closed bottom, which threadably engages with one end of the cutting pen main body. The cutter has a blade at one end, and is rotatably supported by the cutting pen main body in a state in which the blade projects from the one end of the cutting pen main body. A through hole configured to pass the b lade of the cutter is provided in the bottom of the cap. When the cap is screwed into the cutting pen main body, the blade passes through the through hole of the cap and projects from the cap.

This cutting pen is used in a state in which the blade projects from the cap. The projection amount of the blade projecting from the cap changes as the cap is rotated with respect to the cutting pen main body. The projection amount of the blade projecting from the cap will simply be referred to as a "blade extension amount" hereinafter.

The blade extension amount is adjusted by fitting a jig on the cap and rotating the cap with respect to the cutting pen main body together with the jig. The jig has an index to be aligned with each of the marks of blade extension amounts provided on the cutting pen main body. When the jig rotates up to a position where the index aligns with a mark on the cutting pen main body, the blade projects from the cap in a blade extension amount corresponding to the mark.

A cutting pen disclosed in literature 2 can change the blade extension amount in a state in which it is attached to a cutting plotter. The cap of the cutting pen is provided with a pinion gear. The pinion gear is formed into a shape that extends on the outer surface of the cap in the circumferential direction.

In this cutting pen, the blade extension amount is adjusted by moving the cutting pen along the rack of the cutting plotter in a state in which the pinion gear meshes with the rack. The rack is provided on a projecting portion of the cutting plotter. The projecting portion is formed to the same height as the cutting pen and arranged near a work stage on which a cutting target medium is placed.

In the cutting pen described in literature 1, the user manually rotates the cap together with the jig to align the index on the jig with the mark on the cutting pen main body, thereby adjusting the blade extension amount. If the user visually determines whether the index aligns with the mark in this way, the position to stop the jig is incorrect, and the accuracy of the blade extension amount is low. If the blade extension amount is too small, the cutting target medium cannot reliably be cut. If the blade extension amount is too large, the blade may break.

According to the cutting pen described in literature 2, the blade extension amount can be adjusted independently of determination of the user. However, this cutting pen cannot correctly adjust the blade extension amount without using the cutting plotter.

Additionally, in the cutting plotter described in literature 2, the cutting pen is pressed against the rack on the projecting portion when adjusting the blade extension amount. The projecting portion is provided near the work stage, and therefore, interferes with a user's work of placing a cutting target medium on the work stage or extracting a cutting target medium after a process.

SUMMARY OF THE INVENTION

It is an object of the present invention to enable correct adjustment of the blade extension amount of a cutting pen without using a cutting plotter independently of determination of a user. It is another object of the present invention to enable correct adjustment of the blade extension amount of a cutting pen using a cutting plotter with a widely open work stage independently of determination of a user.

In order to achieve the above-described objects, according to the present invention, there is provided a cutting pen comprising a cutting pen main body formed into a tubular shape and including a blade projecting from one end of the cutting pen main body in a longitudinal direction, a medium pressing member including a cap portion including a through hole configured to pass the blade, and inserted into the cutting pen main body to be movable in the longitudinal direction in a state in which the cap portion projects from the one end, and a knock mechanism provided in the cutting pen main body and configured to change a position of the medium pressing member in the longitudinal direction with respect to the cutting pen main body stepwise by causing the medium pressing member to repetitively reciprocally move in the longitudinal direction with respect to the cutting pen main body.

According to the present invention, there is also provided a cutting plotter comprising a work stage on which a sheet-shaped cutting target medium is placed, a pen carriage held at a position facing the work stage to be movable along a principal surface of the cutting target medium, a driving device configured to drive the pen carriage, a cutting pen supported by the pen carriage to be movable in a direction perpendicular to the principal surface, and a pressing device provided on the pen carriage and configured to press the cutting pen against the cutting target medium by a predetermined pressing force, wherein the cutting pen comprises a cutting pen main body formed into a tubular shape and including an attached portion attached to the pen carriage and a blade projecting from one end of the cutting pen main body in a longitudinal direction, a medium pressing member including a cap portion including a through hole configured to pass the blade, and inserted into the cutting pen main body to be movable in the longitudinal direction in a state in which the cap portion projects from the one end, and a knock mechanism provided in the cutting pen main body and configured to change a position of the medium pressing member in the longitudinal direction with respect to the cutting pen main body stepwise by causing the medium pressing member to repetitively reciprocally move in the longitudinal direction with respect to the cutting pen main body, and the work stage includes a knock portion including a hole capable of receiving the blade.

According to the present invention, there is also provided a blade extension amount control method of a cutting plotter, comprising the moving step of moving, along a work stage, a pen carriage to which a cutting pen including a cutting pen main body with a blade projecting from one end, and a cap portion including a through hole configured to pass the blade and movably held at the one end of the cutting pen main body is attached and positioning the cutting pen at a position facing a knock portion including a hole capable of receiving the blade, the first knock step of pressing the cap portion against the knock portion and moving the cutting pen main body to a side of the knock portion with respect to the cap portion, the second knock step of moving the cutting pen main body to a side opposite to the knock portion with respect to the cap portion, and the step of changing a projection amount of the blade with respect to the cap portion stepwise by repetitively executing the first knock step and the second knock step.

DESCRIPTION OF THE PREFERRED EMBODIMENT

Figure 1:
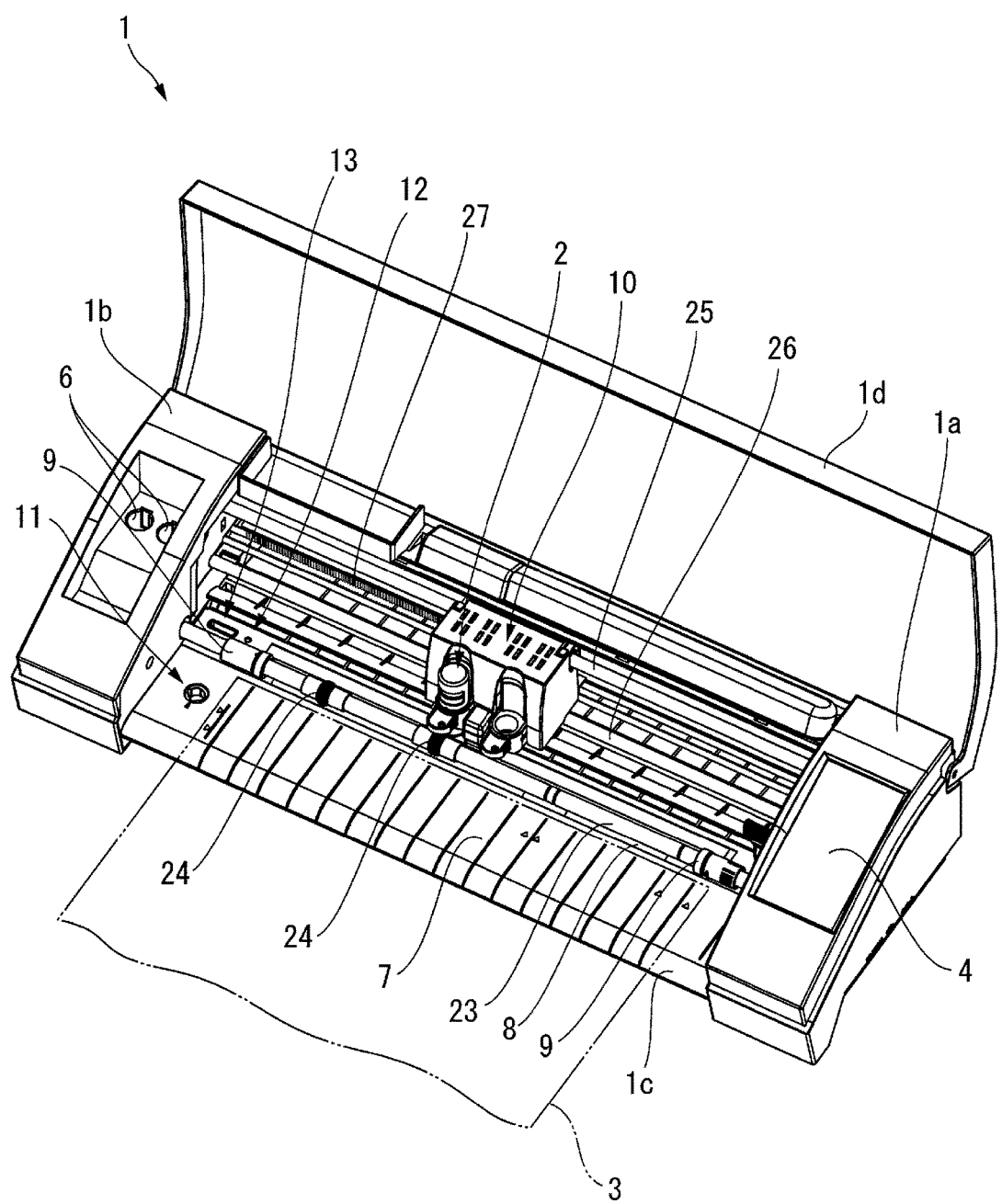
FIG. 1 is a perspective view of a cutting plotter according to an embodiment of the present invention.

A cutting pen, a cutting plotter, and a blade extension amount control method of a cutting plotter according to an embodiment of the present invention will now be described in detail with reference to FIGS. 1 to 19.
<Arrangement of Cutting Plotter>
A cutting plotter 1 shown in FIG. 1 is a device configured to cut out a figure or a character from a sheet-like cutting target medium 3 using a cutting pen 2. The cutting plotter 1 includes an operation unit 1a located at one end in the left-and-right direction in FIG. 1, a cutting pen storage unit 1b located at the other end, a working unit 1c located between the operation unit 1a and the cutting pen storage unit 1b, and an opening/closing cover 1d used to cover these functional units. The cutting plotter 1 is used in a form in which the operation unit 1a and the cutting pen storage unit 1b are arranged in the horizontal direction, and the working unit 1c is opened upward. The direction in which the operation unit 1a and the cutting pen storage unit 1b are arranged will be simply referred to as a left-and-right direction, and a direction orthogonal to the left-and-right direction and the vertical direction will simply be referred to as a front-and-rear direction hereinafter.

Figure 18:
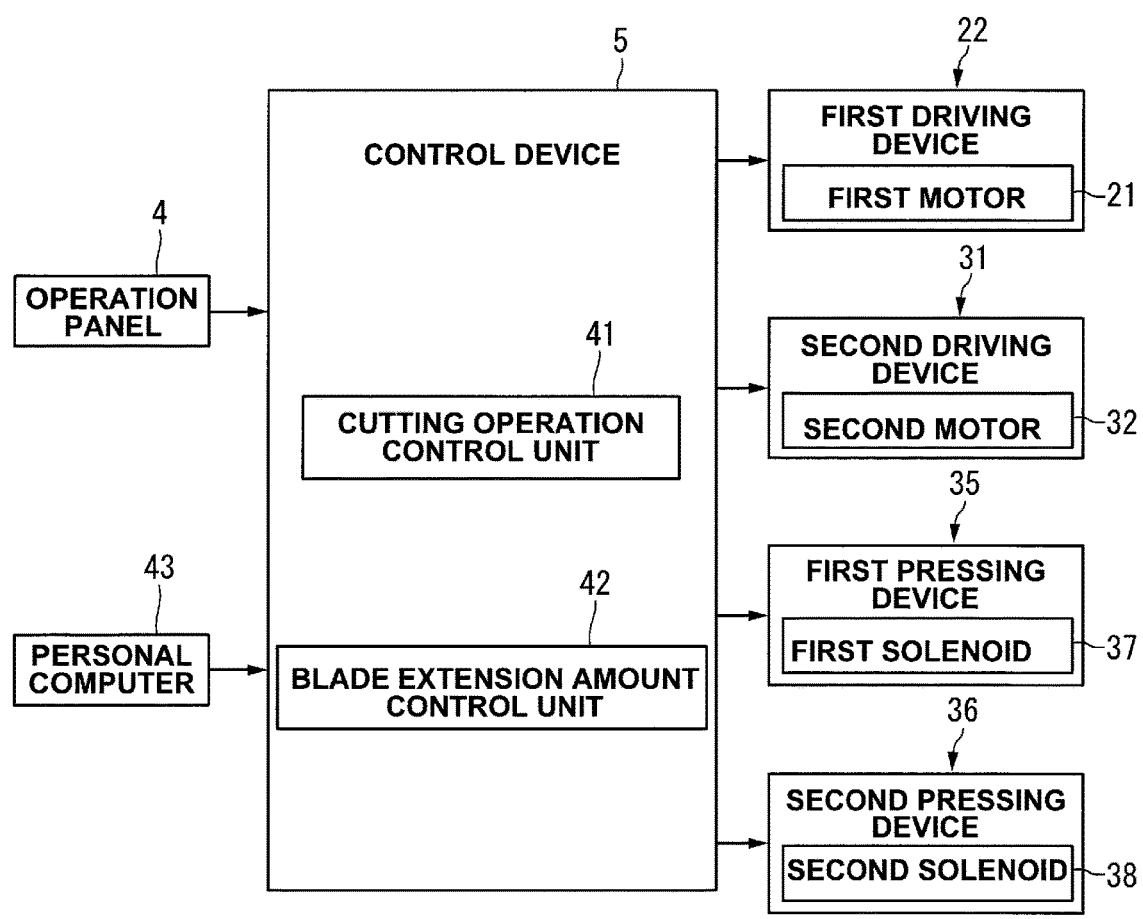
FIG. 18 is a block diagram showing the arrangement of a control system.

The operation unit 1a is provided with an operation panel 4 and a control device 5 (see FIG. 18). Holes 6 each configured to receive a spare cutting pen 2 are formed in the cutting pen storage unit 1b. The working unit 1c is provided with a work stage 7 on which the cutting target medium 3 is placed, a driving roller 8 and a pinch roller 9 configured to convey the cutting target medium 3, and a pen carriage 10 that supports the cutting pen 2.

Figure 16:
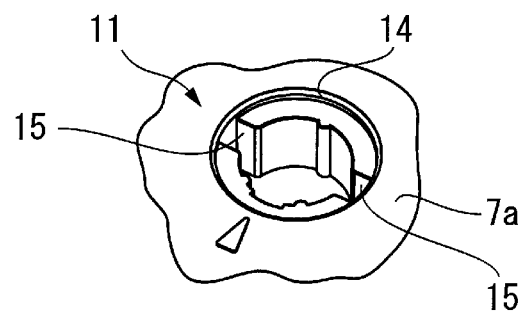
FIG. 16 is an enlarged perspective view of a first knock portion.
Figure 17:
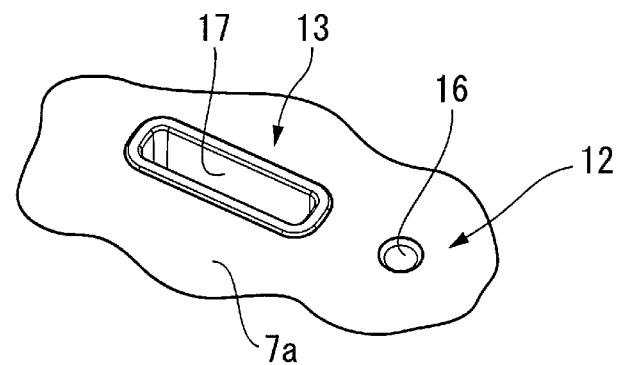
FIG. 17 is an enlarged perspective view of second and third knock portions.

The work stage 7 is formed into a plate shape extending in the horizontal direction and arranged in the front portion of the cutting plotter 1. A first knock portion 11, a second knock portion 12, and a third knock portion 13 (pressed portions) used to change the blade extension amount of the cutting pen 2 are provided at one end of the work stage 7 in the left-and-right direction. As shown in FIG. 16, the first knock portion 11 includes a circular concave portion 14 open to an upper surface 7a of the work stage 7, and a pair of grooves 15 extending downward from the opening edge of the circular concave portion 14. As shown in FIG. 17, the second knock portion 12 is formed by the upper surface 7a of the work stage 7, and a small hole 16 open to the upper surface 7a. As shown in FIG. 17, the third knock portion 13 is formed by the upper surface 7a of the work stage 7, and a long hole 17 open to the upper surface 7a. The long hole 17 is formed to be long in the left-and-right direction. The second knock portion 12 and the third knock portion 13 are provided side by side in the left-and-right direction within a range reachable by the cutting pen 2 attached to the pen carriage 10. The upper surface 7a of the work stage 7 forms a "flat surface". The circular concave portion 14, the small hole 16, and the long hole 17 form "holes" capable of receiving a blade 44 of the cutting pen 2. The application purpose of the first knock portion 11, the second knock portion 12, and the third knock portion 13 will be described later.

The driving roller 8 is arranged across the intermediate portion of the work stage 7 in the left-and-right direction and rotatably supported by a frame (not shown) of the cutting plotter 1. The driving roller 8 is connected to a first driving device 22 that uses a first motor 21 (see FIG. 18) as a power source. The driving roller 8 is driven by the first driving device 22 and rotates forward or backward. The operation of the first motor 21 is controlled by the control device 5.

The pinch roller 9 is formed into a cylindrical shape. The pinch roller 9 is fixed to a rotating shaft 23 that extends through the pinch roller 9 and located above the driving roller 8. The rotating shaft 23 is arranged in parallel to the driving roller 8 and rotatably supported by the above-described frame. The rotating shaft 23 and the driving roller 8 are arranged at positions where the cutting target medium 3 on the work stage 7 can be sandwiched between the pinch roller 9 and the driving roller 8. When the driving roller 8 rotates in a state in which the cutting target medium 3 is sandwiched between the pinch roller 9 and the driving roller 8, the cutting target medium 3 moves in the front-and-rear direction along the work stage 7. A roller (coil spring) 24 configured to press the cutting target medium 3 from above is provided at the intermediate portion of the rotating shaft 23.

The pen carriage 10 is held at a position facing (above) the work stage 7 to be movable along the principal surface of the cutting target medium 3. More specifically, the pen carriage 10 is movably supported by two guide rods 25 and 26 extending in the left-and-right direction, and a driving belt 27 is connected to the pen carriage 10. The driving belt 27 forms a part of a second driving device 31 (see FIG. 18) that drives the pen carriage 10. The second driving device 31 includes a second motor 32. The rotation of the second motor 32 is converted into a reciprocal motion by the driving belt 27 to drive the pen carriage 10 in the left-and-right direction. The operation of the second motor 32 is controlled by the control device 5.

Figure 2:
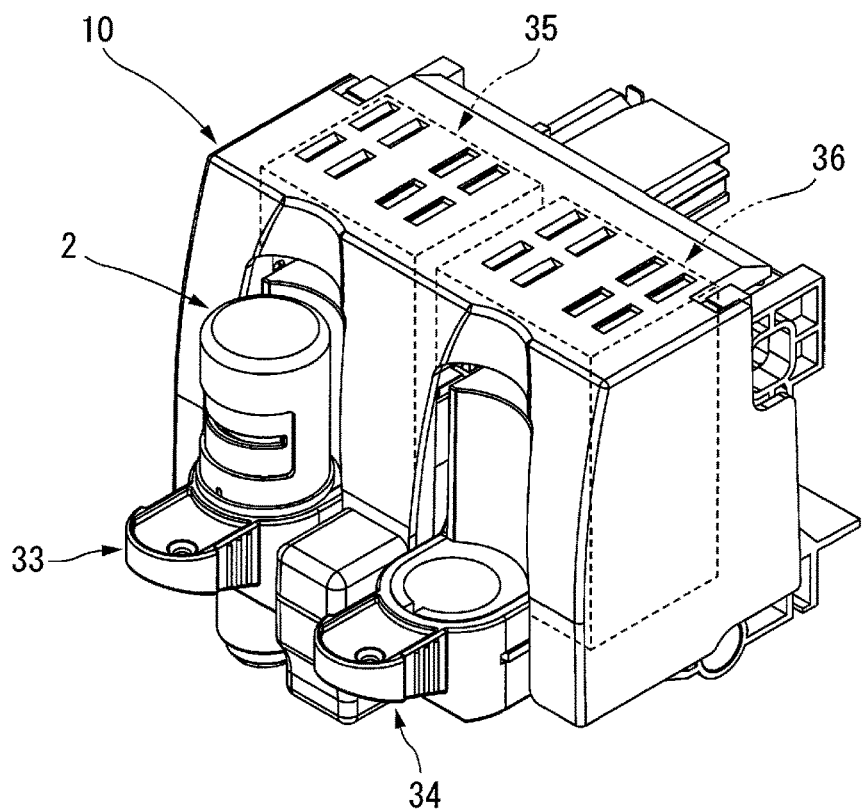
FIG. 2 is an enlarged perspective view of a pen carriage.

The pen carriage 10 is also configured to support the cutting pen 2 so that it can move in a direction (vertical direction) perpendicular to the principal surface of the cutting target medium 3. More specifically, as shown in FIG. 2, the pen carriage 10 includes a first holder 33 and a second holder 34 each configured to hold the cutting pen 2, and a first pressing device 35 and a second pressing device 36 each configured to drive a corresponding one of the first holder 33 and the second holder 34 in the vertical direction. Each of the first holder 33 and the second holder 34 has a function of detachably holding the cutting pen 2.

Each of the first pressing device 35 and the second pressing device 36 presses the cutting pen 2 against the cutting target medium 3 by a predetermined pressing force. More specifically, the first pressing device 35 includes a first solenoid 37 (see FIG. 18) configured to press the first holder 33 downward, and a spring member (not shown) that biases the first holder 33 upward. The second pressing device 36 includes a second solenoid 38 configured to press the second holder 34 downward, and a spring member (not shown) that biases the second holder 34 upward. The first solenoid 37 and the second solenoid 38 according to this embodiment can change the pressing force in two steps. The operations of the first solenoid 37 and the second solenoid 38 are controlled by the control device 5.

As shown in FIG. 18, the control device 5 includes a cutting operation control unit 41 and a blade extension amount control unit 42 and is connected to the operation panel 4 and a personal computer 43 used to create cutting data. The cutting operation control unit 41 controls the operations of the first driving device 22, the second driving device 31, the first pressing device 35, and the second pressing device 36 based on cutting data sent from the personal computer 43. The blade extension amount control unit 42 controls the operations of the first driving device 22, the second driving device 31, the first pressing device 35, and the second pressing device 36 when adjusting the blade extension amount of the cutting pen 2 by the cutting plotter 1. Note that the control device 5 is formed from a computer.

<Arrangement of Cutting Pen>

Figure 3:
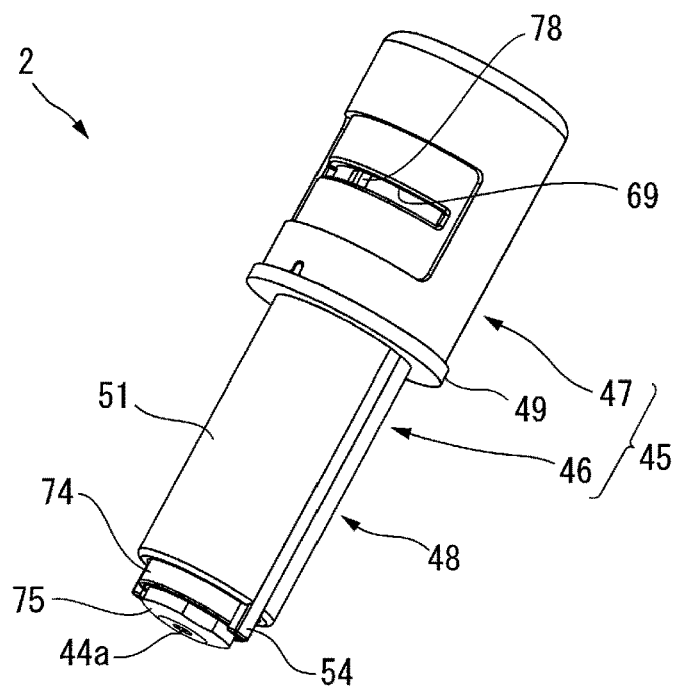
FIG. 3 is a perspective view of a cutting pen.
Figure 4:
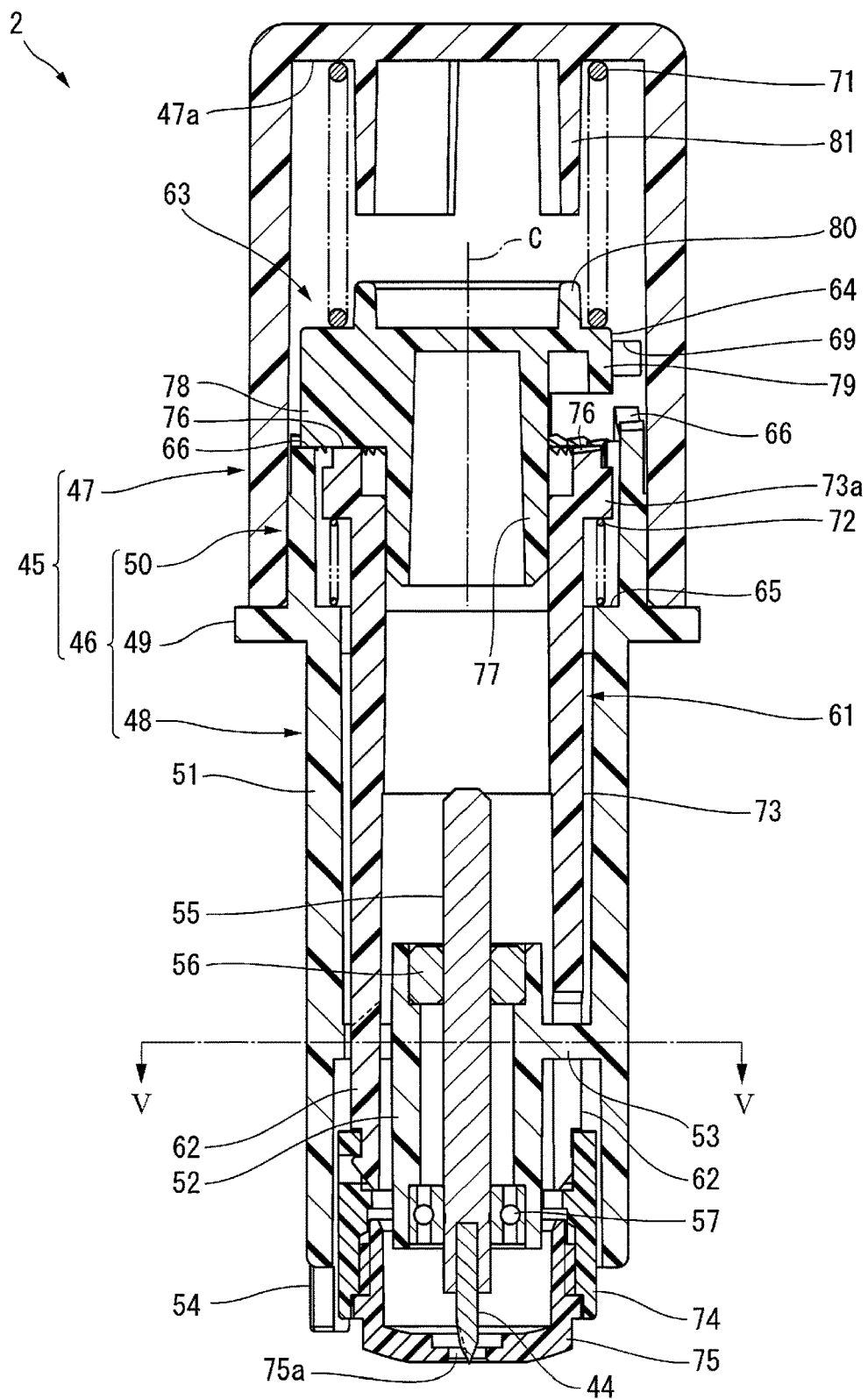
FIG. 4 is a sectional view of the cutting pen.

As shown in FIGS. 3 and 4, the cutting pen 2 is formed by assembling a plurality of parts to be described later to a tubular cutting pen main body 45 with the blade 44 projecting from one end on the lower side in these drawings. The blade 44 projects from one end of the cutting pen main body 45 in the longitudinal direction, as will be described later in detail. As for a direction to be described below, if the direction is parallel to the longitudinal direction of the cutting pen main body 45, it will simply be referred to as a "vertical direction". As for a position to be described below, if the position is located on one end side of the cutting pen main body 45, it will simply be referred to as a "lower side". A position on the opposite side (the other end side of the cutting pen main body 45) will simply be referred to as an "upper side".

<Explanation of Cutting Pen Main Body>

Figure 6:
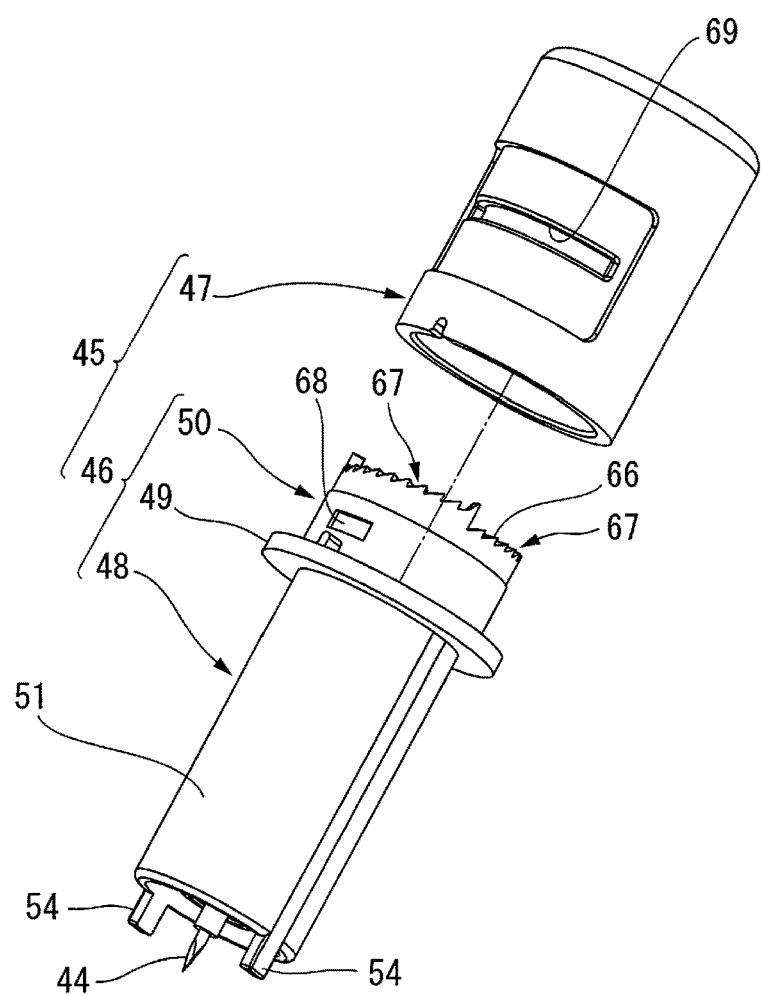
FIG. 6 is an exploded perspective view of a cutting pen main body.

As shown in FIG. 6, the cutting pen main body 45 according to this embodiment is formed by a tubular cutter holding portion 46 with the blade 44 projecting from one end, and a cover portion 47 configured to close the other end of the cutter holding portion 46. The cutter holding portion 46 includes three functional portions arranged in the vertical direction. These functional units include a first tubular portion 48 formed longest in the vertical direction, and a flange portion 49 and a second tubular portion 50 which are provided on the upper side of the first tubular portion 48.

Figure 5:
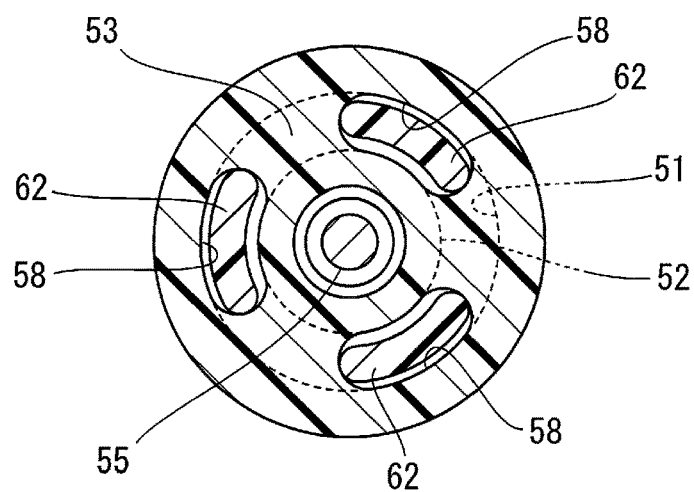
FIG. 5 is a sectional view taken along a line V-V in FIG. 4.

The first tubular portion 48 has a function of detachably fitting in each of the above-described first holder 33 and the second holder 34. As shown in FIGS. 4 and 5, the first tubular portion 48 is formed by an outer tube 51 formed into a cylindrical shape, an inner tube 52 located in the axial portion of the outer tube 51, and a partition plate 53 that connects the outer tube 51 and the inner tube 52. The outer tube 51, the inner tube 52, the partition plate 53, and the flange portion 49 and the second tubular portion 50 (to be described later) are integrally formed by integral molding using a plastic as a material.

Two stoppers 54 are provided at one end of the outer tube 51. Each of the stoppers 54 is formed into a shape in which a portion of the outer tube 51 partially projects in the vertical direction. The stoppers 54 are provided at positions to divide the outer tube 51 into two equal parts in the circumferential direction.

The inner tube 52 is located on the same axis as the outer tube 51 by the partition plate 53. In the inner tube 52, a cutter 55 having the above-described blade 44 is rotatably supported by bearings 56 and 57. The cutter 55 is located on the same axis as the outer tube 51 and the inner tube 52. The position of the cutter 55 with respect to the first tubular portion 48 in the axial direction is fixed.

As shown in FIG. 5, three through holes 58 are formed in the partition plate 53. The through holes 58 are used to pass three pawl pieces 62 of a medium pressing member 61 (see FIG. 7) to be described later. The through holes 58 are formed at positions to divide the outer tube 51 into three equal parts in the circumferential direction.

The flange portion 49 has a function of deciding the position of the cutting pen 2 in the vertical direction with respect to the first holder 33 or the second holder 34 when the cutting pen 2 is attached to the first holder 33 or the second holder 34. The flange portion 49 according to this embodiment has a ring shape whose outer diameter is larger than that of the outer tube 51, and is formed into a shape to overlap the first holder 33 or the second holder 34 from above.

The flange portion 49 is connected to the upper side end of the outer tube 51. The flange portion 49 forms an "attached portion" with which the cutting pen main body 45 is attached to the pen carriage 10.

The second tubular portion (cylindrical portion) 50 is formed into a cylindrical shape and connected to the upper side end of the flange portion 49. The second tubular portion 50 has a function of supporting the cover portion 47 and a function of supporting a rotation member 64 of a knock mechanism 63 (see FIG. 8) to be described later by being located on the same axis as the rotation member 64. The outer diameter of the second tubular portion 50 according to this embodiment is larger than the outer diameter of the outer tube 51 and smaller than the outer diameter of the flange portion 49, as shown in FIG. 4. The inner diameter of the second tubular portion 50 is larger than the inner diameters of the outer tube 51 and the flange portion 49. For this reason, a step portion 65 formed from the inner edge portion of the flange portion 49 is formed at the boundary between the second tubular portion 50 and the flange portion 49.

Figure 9:
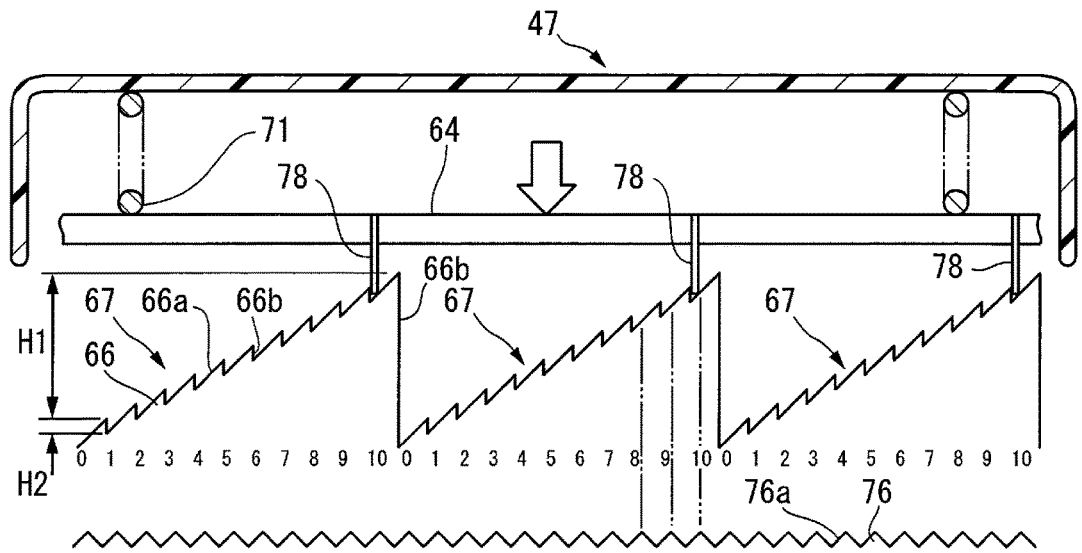
FIG. 9 is a schematic view for explaining the arrangement of the knock mechanism.

As shown in FIG. 6, a plurality of serrated teeth 66 that form a part of the knock mechanism 63 to be described later are formed at the upper side end of the second tubular portion 50. The teeth 66 are provided on the entire second tubular portion 50 in the circumferential direction without interruption. In addition, the teeth 66 are arranged stepwise when viewed from a direction orthogonal to the vertical direction, as shown in FIG. 9. In other words, the plurality of teeth 66 are arranged such that the apexes and bottoms of the teeth 66 form a slope downward in one (leftward in FIG. 9) of the circumferential directions of the second tubular portion 50 (come close to the one end of the cutting pen main body 45).

The upper side end of the second tubular portion 50 is divided into a plurality of regions in the circumferential direction. A staircase 67 formed from a set of a plurality of teeth 66 is formed in each region. That is, the staircases 67 are provided at the upper end of the second tubular portion 50 spatially periodically in the circumferential direction. In this embodiment, the staircase 67 is provided in each of three regions formed by dividing the second tubular portion 50 into three equal parts in the circumferential direction. The three staircases 67 shown in FIG. 9 are each formed by 11 teeth 66.

Each of the serrated teeth 66 includes a tilting positioning surface 66a, and a guide surface 66b extending in the vertical direction. The positioning surface 66a tilts in the same direction as the staircase 67. That is, the positioning surface 66a tilts in a shape that gradually tilts downward in the direction (the left side in FIG. 9) in which the height of the staircase 67 decreases. The tooth 66 located at the lowermost position and the tooth 66 located at the uppermost position are adjacent to each other in the circumferential direction of the second tubular portion 50. In this embodiment, the tooth 66 located at the lowermost position of the staircase 67 and the tooth 66 located at the uppermost position of another staircase 67 adjacent to the staircase 67 are adjacent to each other in the circumferential direction of the second tubular portion 50. More specifically, the lowermost portion of the positioning surface 66a located at the lowermost position of the staircase 67 is connected to the guide surface 66b of the tooth 66 located at the uppermost position of another staircase 67 adjacent to the staircase 67.

As shown in FIG. 6, a concave portion 68 used to fix the cover portion 47 is formed in the outer surface of the second tubular portion 50.

The cover portion 47 is formed into a cylindrical shape with a closed bottom, which is fitted on the second tubular portion 50. A pawl (not shown) configured to engage with the concave portion 68 to the second tubular portion 50 is provided on the inner surface of the cover portion 47. When the pawl engages with the concave portion 68, the cover portion 47 is fixed to the cutter holding portion 46. A through hole 69 extending in the circumferential direction (the rotation direction of the rotation member 64 (see FIG. 8) to be described later) is formed at the intermediate portion of the cover portion 47 in the vertical direction.

As shown in FIG. 4, the medium pressing member 61 projecting from one end of the cutting pen main body 45, the rotation member 64 arranged on the upper side of the medium pressing member 61, a first spring member 71 arranged on the upper side of the rotation member 64, and a second spring member 72 through which the medium pressing member 61 extends are stored in the cutting pen main body 45.

<Arrangement of Medium Pressing Member>

Figure 7:
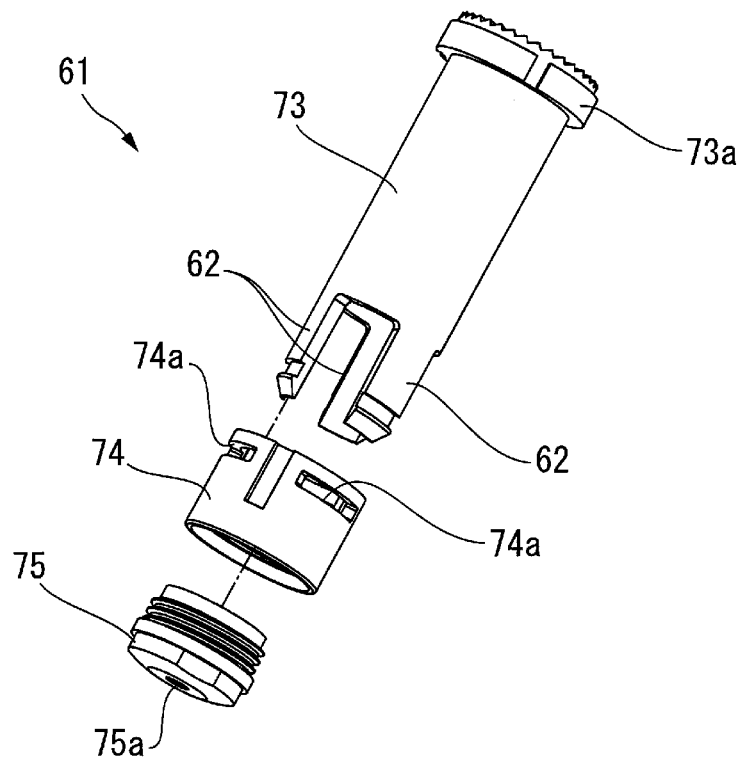
FIG. 7 is an exploded perspective view of a medium pressing member.

As shown in FIG. 7, the medium pressing member 61 according to this embodiment is formed by three members. The three members include a shaft portion 73 formed into a cylindrical shape extending in the vertical direction, a cylindrical connecting portion 74 attached to the lower end of the shaft portion 73, and a cylindrical cap portion 75 with a closed bottom screwed in the connecting portion 74.

The three pawl pieces 62 extending in the vertical direction are provided at one end of the shaft portion 73. The pawl pieces 62 are movably fitted in the above-described through holes 58 formed in the partition plate 53 of the cutting pen main body 45.

When the pawl pieces 62 engage with engaging holes 74a of the connecting portion 74 in a state in which the pawl pieces 62 are passed through the through holes 58, respectively, the connecting portion 74 is fixed to the shaft portion 73. For this reason, the medium pressing member 61 inserted into the cutting pen main body 45 can move with respect to the cutting pen main body 45 in the vertical direction but cannot rotate with respect to the cutting pen main body 45 in the circumferential direction of the shaft portion 73. A through hole 75a is formed at the center of the cap portion 75 to pass the blade 44.

Figure 10:
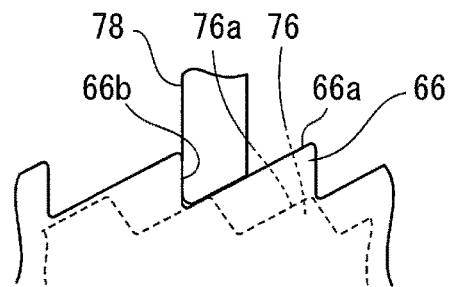
FIGS. 10 to 15 are schematic views for explaining the operation of the knock mechanism.

An annular convex portion 73a whose outer diameter is larger than those of other portions of the shaft portion 73 is provided at the upper side end of the shaft portion 73. In addition, a plurality of cams 76 that form a part of the knock mechanism 63 to be described later are also provided. The cams 76 are each formed to have a mountain-shape section when viewed from a direction orthogonal to the vertical direction and are also arranged in the circumferential direction of the shaft portion 73, as shown in FIG. 9. Each of the cams 76 includes a cam face 76a that gradually tilts downward (downward in FIG. 9) in the direction (the left side in FIG. 9) in which the height of the above-described staircase 67 decreases. As shown in FIG. 10, the cam face 76a is formed into a shape in which the cam face 76a is parallel to the positioning surfaces 66a of the serrated teeth 66 when viewed from the direction orthogonal to the vertical direction, and an almost half of the apex side of the cam 76 overlaps the positioning surface 66a in a natural state. The natural state here is a state in which the cap portion 75 is not pressed upward. Note that the plurality of teeth 66 and the plurality of cams 76 are arranged in the same period when viewed from the rotation center (axis C) of the rotation member 64.

<Arrangement of Knock Mechanism>

The knock mechanism 63 is provided in the cutting pen main body 45, and formed by the above-described serrated teeth 66 and the cams 76, the rotation member 64 to be described later, the first spring member 71, and the second spring member 72. The knock mechanism 63 according to this embodiment can change the position of the medium pressing member 61 in the vertical direction stepwise by making the medium pressing member 61 repetitively reciprocally move with respect to the cutting pen main body 45, as will be described later in detail.

Figure 8:
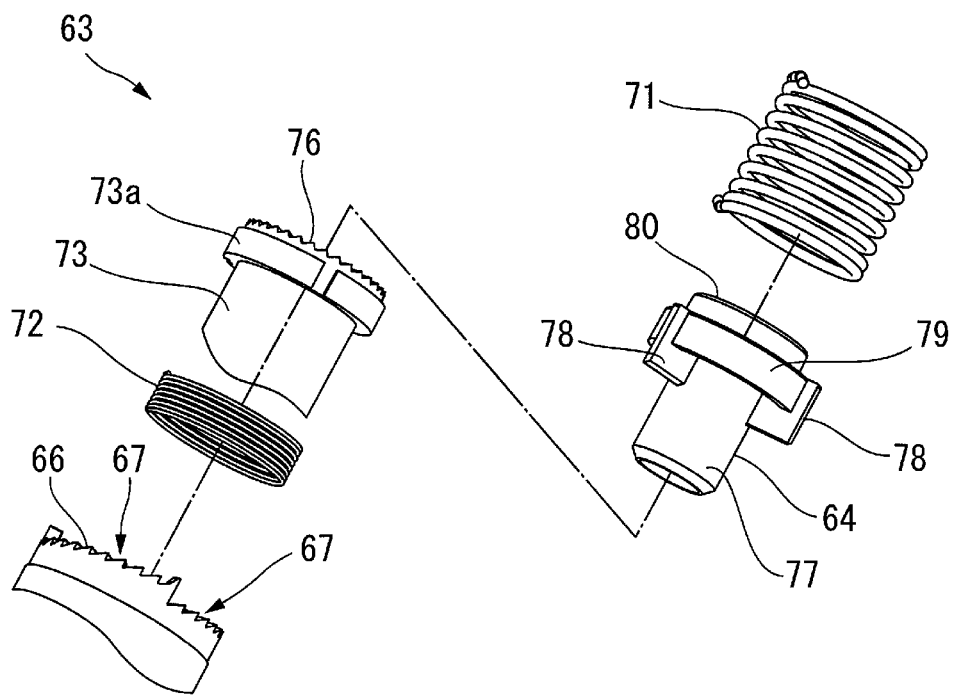
FIG. 8 is an exploded perspective view of a knock mechanism.

As shown in FIG. 8, the rotation member 64 includes a cylinder 77, and a plurality of connecting pieces 78 projecting from the outer surface of the cylinder 77 outward in the radial direction. The cylinder 77 forms the lower end of the rotation member 64, and is formed into a shape to be movably fitted in the medium pressing member 61. The connecting pieces 78 are provided at the upper end of the rotation member 64. In this embodiment, the three connecting pieces 78 are provided at positions to divide the cylinder 77 into three equal parts in the circumferential direction. The connecting pieces 78 are each formed into a plate shape radially extending from the cylinder 77 as the center. The lower end of each connecting piece 78 is formed into a shape conforming to the positioning surface 66a of the serrated tooth 66, as shown in FIG. 10.

The rotation member 64 is stored in the cutting pen main body 45 in a state in which the cylinder 77 is fitted in the medium pressing member 61, and the three connecting pieces 78 are in contact with the serrated teeth 66 of the cutting pen main body 45. The above-described through hole 69 of the cover portion 47 is formed at a position where the connecting piece 78 in contact with the serrated teeth 66 is exposed. A label (not shown) that forms an indicator in cooperation with the connecting piece 78 is pasted to a portion along the through hole 69 of the outer surface of the cover portion 47. Numbers representing blade extension amounts are printed on the label.

The upper end of the rotation member 64 is provided with reinforcing ribs 79 that connect the connecting pieces 78 in the circumferential direction of the cylinder 77 and a ring-shaped protrusion 80 located on the same axis as the cylinder 77. The protrusion 80 projects on the upper side of the connecting pieces 78 and the reinforcing ribs 79.

The first spring member 71 is formed by a compression coil spring and inserted, in a compressed state, between the upper end of the rotation member 64 and a bottom wall 47a of the cover portion 47, as shown in FIG. 4. The bottom wall 47a of the cover portion 47 is provided with a tubular body 81 to be inserted into the first spring member 71. The first spring member 71 is assembled in a state in which the tubular body 81 is inserted, and the protrusion 80 of the rotation member 64 is inserted. When the first spring member 71 is thus assembled between the rotation member 64 and the bottom wall 47a of the cover portion 47, the rotation member 64 is biased downward by the spring force of the first spring member 71, and the three connecting pieces 78 are pressed against the serrated teeth 66 from the upper side. In this pressed state, the connecting pieces 78 contact the positioning surfaces 66a of the serrated teeth 66.

The second spring member 72 is formed by a compression coil spring and assembled between the step portion 65 of the cutting pen main body 45 (flange portion 49) and the convex portion 73a of the medium pressing member 61 (shaft portion 73) in a state in which the second spring member 72 is compressed, and the shaft portion 73 of the medium pressing member 61 is inserted into the second spring member 72, as shown in FIG. 4. When the second spring member 72 is thus assembled, the medium pressing member 61 is biased upward by the spring force of the second spring member 72 and pressed against the rotation member 64 from the lower side. In this pressed state, the cam faces 76a of the cams 76 contact the connecting pieces 78.

The spring force of the second spring member 72 is smaller than the spring force of the first spring member 71. For this reason, in the natural state in which no pressing force is applied to the cap portion 75 of the medium pressing member 61, the connecting pieces 78 are pressed against the serrated teeth 66 by the spring force of the first spring member 71 against the spring force of the second spring member 72. In this state, as shown in FIG. 10, each connecting piece 78 is pressed by the spring force of the first spring member 71 and located at the lowermost portion of the positioning surface 66a and also brought into contact with the guide surface 66b of the adjacent tooth 66. The position of the rotation member 64 at which the connecting pieces 78 contact the guide surfaces 66b is "the stop position regulated by the cutting pen main body".

The cams 76 of the medium pressing member 61 are formed into a shape that brings a part of the cam faces 76a into contact with the connecting pieces 78 along the guide surfaces 66b. The part of the cam faces 76a is a part that is located on the apex side of the cams 76 having a mountain-shape section.

The spring force of the first spring member 71 is larger than the pressing force applied to the medium pressing member 61 when cutting the cutting target medium 3 by the cutting pen 2. In other words, the spring force of the first spring member 71 has a magnitude to regulate the upward movement of the medium pressing member 61 with respect to the cutting pen main body 45 by the cutting operation. For this reason, cutting is correctly executed in a state in which the medium pressing member 61 is pressed against the cutting target medium 3 at the time of cutting.

When the cap portion 75 of the medium pressing member 61 is pressed upward by a force larger than the spring force of the first spring member 71, the medium pressing member 61 moves upward with respect to the cutting pen main body 45. When the medium pressing member 61 moves in this way, the blade 44 projects from the cap portion 75 via the through hole 75a of the cap portion 75. When the position of the medium pressing member 61 with respect to the cutting pen main body 45 in the vertical direction changes, the position of the cap portion 75 with respect to the blade 44 changes, and the projection amount of the blade 44 projecting from the cap portion 75 changes. The projection amount of the blade 44 with respect to the cap portion 75 is the "blade extension amount". The knock mechanism 63 is configured to change the blade extension amount.

<Explanation of Operation of Knock Mechanism>

The procedure of changing the blade extension amount by the knock mechanism 63 will be described here with reference to FIGS. 10 to 15.

In a state in which the connecting pieces 78 of the rotation member 64 are located halfway through the staircases 67 formed from the plurality of serrated teeth 66, as shown in FIG. 10, each connecting piece 78 is located at the lowermost position of the corresponding positioning surface 66a.

Figure 11:
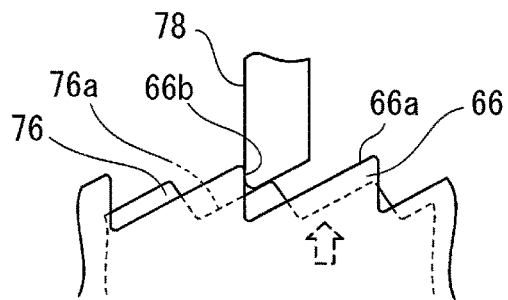

When the medium pressing member 61 moves upward with respect to the cutting pen main body 45 in this state, as shown in FIG. 11, the cams 76 of the medium pressing member 61 move upward to press the connecting pieces 78 upward. At this time, the connecting piece 78 is pressed against the guide surface 66b of the next adjacent tooth 66 by a thrust acting in a direction along the tilting cam face 76a. The next tooth 66 is the tooth 66 located one step below in the staircase 67.

Figure 12:
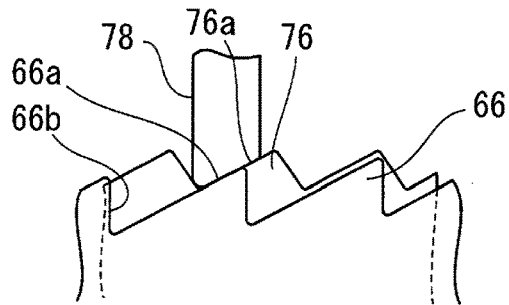

When the medium pressing member 61 further moves upward, the connecting piece 78 moves over the distal end of the guide surface 66b, and the regulation by the guide surface 66b is canceled. When the regulation is canceled in this way, the connecting piece 78 slides down along the cam face 76a, and moves to the lowest valley portion of the cam 76 and stops, as shown in FIG. 12. At this time, the rotation member 64 rotates by a predetermined angle as its downward movement is converted into a rotation operation about the axis C (see FIG. 4) extending in the vertical direction. The rotation direction of the rotation member 64 at this time is one of the circumferential directions of the second tubular portion 50 or a direction in which the staircase 67 made of the plurality of serrated teeth 66 lowers.

Figure 13:
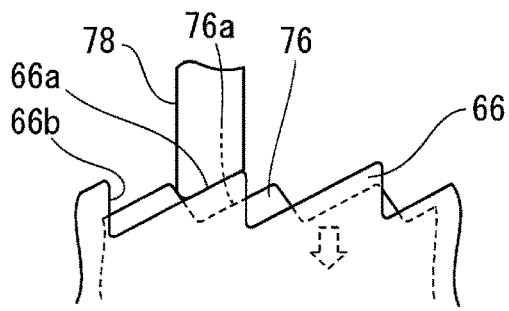

After the connecting piece 78 thus moves to the valley portion of the cam 76, the moving direction of the medium pressing member 61 reverses, and the medium pressing member 61 moves downward with respect to the cutting pen main body 45. Accordingly, as shown in FIG. 13, the valley portion of the cam 76 moves to the lower side of the positioning surface 66a of the next tooth 66. At this time, the connecting piece 78 comes into contact with the positioning surface 66a of the next tooth 66 from the upper side and is pressed against the apex of the cam 76 by a thrust acting in a direction along the positioning surface 66a. The connecting piece 78 then slides down along the positioning surface 66a as the cam 76 further moves downward.

Figure 14:
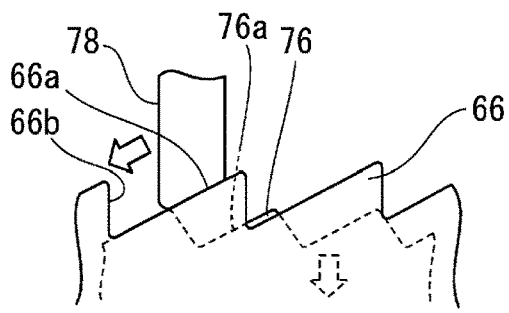
Figure 15:
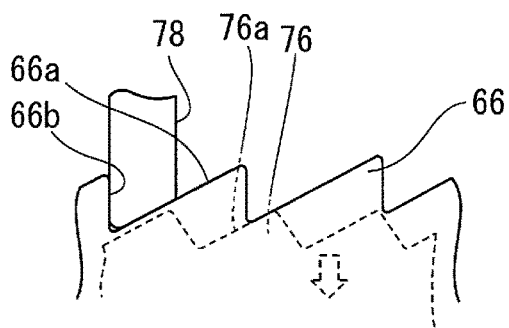

When the medium pressing member 61 further moves downward, and the apex of the cam 76 moves to the lower side of the positioning surface 66a, as shown in FIG. 14, the connecting piece 78 whose movement regulation by the apex of the cam 76 is canceled further moves along the positioning surface 66a. This movement is regulated by bringing the connecting piece 78 into contact with the guide surface 66b of the tooth 66 located next to the next tooth 66. The tooth 66 located next to the next tooth 66 here is the tooth 66 located one more step below in the staircase 67.

For this reason, when the medium pressing member 61 moves upward with respect to the cutting pen main body 45 by a length enough to move over one step of the staircase 67 and then returns to the initial position, the connecting piece 78 moves to the tooth 66 located one step below in the staircase 67, and the rotation member 64 rotates by a corresponding amount. That is, the rotation member 64 rotates by a predetermined angle as its reciprocal movement of the medium pressing member 61 in the vertical direction is converted into a rotation operation about the axis C extending in the vertical direction.

The length enough to move over one step of the staircase 67 is a length less than a difference H1 of elevation between the tooth 66 at the lowermost position of the staircase 67 and the tooth 66 at the uppermost position of the staircase 67 and more than a difference H2 of elevation between the teeth 66 adjacent to each other halfway on the staircase 67, as shown in FIG. 9. In other words, the length enough to move over one step of the staircase 67 can also be expressed as a length less than the distance H1 between the apex of the tooth 66 at the position closest to one end of the cutting pen main body 45 in the longitudinal direction out of the plurality of serrated teeth 66 and the apex of the tooth 66 at the position closest to the other end of the cutting pen main body 45 in the longitudinal direction and more than the distance H2 between the apexes of the teeth 66 adjacent to each other in the longitudinal direction.

The distance in the vertical direction between the distal end of the stoppers 54 of the cutting pen 2 and the distal end of the cap portion 75 that projects from the cutting pen main body 45 and stops in the natural state equals the length enough to move over one step of the staircase 67.

The reciprocal operation of the medium pressing member 61 that moves upward by the length enough to move over one step of the staircase 67 and then returns will be referred to as a "first knock operation". When the first knock operation is performed, the rotation member 64 rotates by an angle corresponding to one step of the staircase 67 and moves downward with respect to the cutting pen main body 45 by a distance corresponding to the step difference of one step of the staircase 67. For this reason, if the first knock operation is repetitively performed, the positions of the rotation member 64 and the medium pressing member 61 in the vertical direction change stepwise, and the blade extension amount changes stepwise. According to this embodiment, since the staircases 67 made of the plurality of serrated teeth 66 are formed to gradually lower, the cap portion 75 of the medium pressing member 61 lowers stepwise, and the blade extension amount decreases stepwise. When the connecting pieces 78 move to the teeth 66 at the lowermost position of the staircases 67, the blade extension amount is minimized. In this embodiment, the blade extension amount is 0 in this state.

Each connecting piece 78 that has moved to the tooth 66 at the lowermost position of the corresponding one of the staircases 67 hits the guide surface 66b of the tooth 66 at the highest position of the adjacent staircase 67. The guide surface 66b is formed to be longer in the vertical direction than the guide surface 66b of the tooth 66 located halfway on the staircase 67. For this reason, the connecting piece 78 never moves over the long guide surface 66b in the first knock operation.

When the medium pressing member 61 moves upward by a distance more than the length of the movement by the first knock operation, the connecting piece 78 moves over the long guide surface 66b and moves to the positioning surface 66a of the tooth 66 at the highest position of the adjacent staircase 67. When the connecting piece 78 moves to the next staircase 67, the blade extension amount is maximized. The reciprocal operation of the medium pressing member 61 that moves the connecting piece 78 to the tooth 66 at the highest position of the adjacent staircase 67 will be referred to as a "second knock operation".

<Manual Adjustment of Blade Extension Amount>

The blade extension amount is adjusted manually or automatically. To manually adjust the blade extension amount, the user holds the cutting pen 2 in the hand and presses it against the first knock portion 11 of the cutting plotter 1 shown in FIG. 16. The lower end of the cap portion 75 is fitted in the circular concave portion 14 of the first knock portion 11, and the circular concave portion 14 regulates the downward movement of the cap portion 75 from the fitting state. The grooves 15 of the first knock portion 11 are formed into shapes capable of receiving the pair of stoppers 54 of the cutting pen main body 45 and permit the stoppers 54 to move to the lower side of the upper surface 7a of the work stage 7.

When the cutting pen 2 is pressed against the first knock portion 11, the cutting pen main body 45 move downward in a state in which the cap portion 75 hits the opening edge of the circular concave portion 14, and the stoppers 54 of the cutting pen main body 45 are inserted into the grooves 15 of the first knock portion 11. In this case, the cutting pen main body 45 lowers and then rises with respect to the medium pressing member 61, thereby changing the blade extension amount.

When manually adjusting the blade extension amount, the user can know that the rotation member 64 rotates, and the blade extension amount changes by a sound or a vibration transmitted to the hand that holds the cutting pen 2. The sound or vibration is generated once in each of the process of lowering the cutting pen main body 45 and the process of raising the cutting pen main body 45. In the process of lowering the cutting pen 2, a sound or vibration is generated when the connecting piece 78 moves over the guide surface 66b of the tooth 66 and then moves along the cam face 76a of the cam 76 and hits the apex of the cam 76. In the process of raising the cutting pen main body 45, a sound or vibration is generated when the connecting piece 78 hits the guide surface 66b of the next tooth 66.

When manually adjusting the blade extension amount, the above-described knock operation is performed while viewing the connecting piece 78 seen through the through hole 69 of the cover portion 47 and the numbers on the label pasted to the cover portion 47. The blade extension amount is adjusted by performing the knock operation until the connecting piece 78 moves to the position of the number on the label corresponding to a desired blade extension amount.

<Automatic Adjustment of Blade Extension Amount>

To automatically adjust the blade extension amount, the cutting pen 2 is pressed against the second knock portion 12 or the third knock portion 13 of the cutting plotter 1 shown in FIG. 17. The small hole 16 of the second knock portion 12 is formed into a shape capable of receiving the blade 44 in a state in which the cap portion 75 abuts against the upper surface 7a of the work stage 7. The second knock portion 12 regulates the downward movement of the cap portion 75 and the connecting portion 74 and also regulates the movement of the stoppers 54 of the cutting pen main body 45 to the lower side of the upper surface 7a of the work stage 7.

The long hole 17 of the third knock portion 13 is formed into a shape capable of receiving the blade 44 and the stoppers 54 in a state in which the cap portion 75 abuts against the upper surface 7a of the work stage 7. The length of the long hole 17 in the left-and-right direction is longer than the diameter of one end of the outer tube 51 from which the two stoppers 54 project. The third knock portion 13 regulates the downward movement of the cap portion 75 and the connecting portion 74 and permits the movement of the stoppers 54 to the lower side of the upper surface 7a of the work stage 7.

Figure 19:
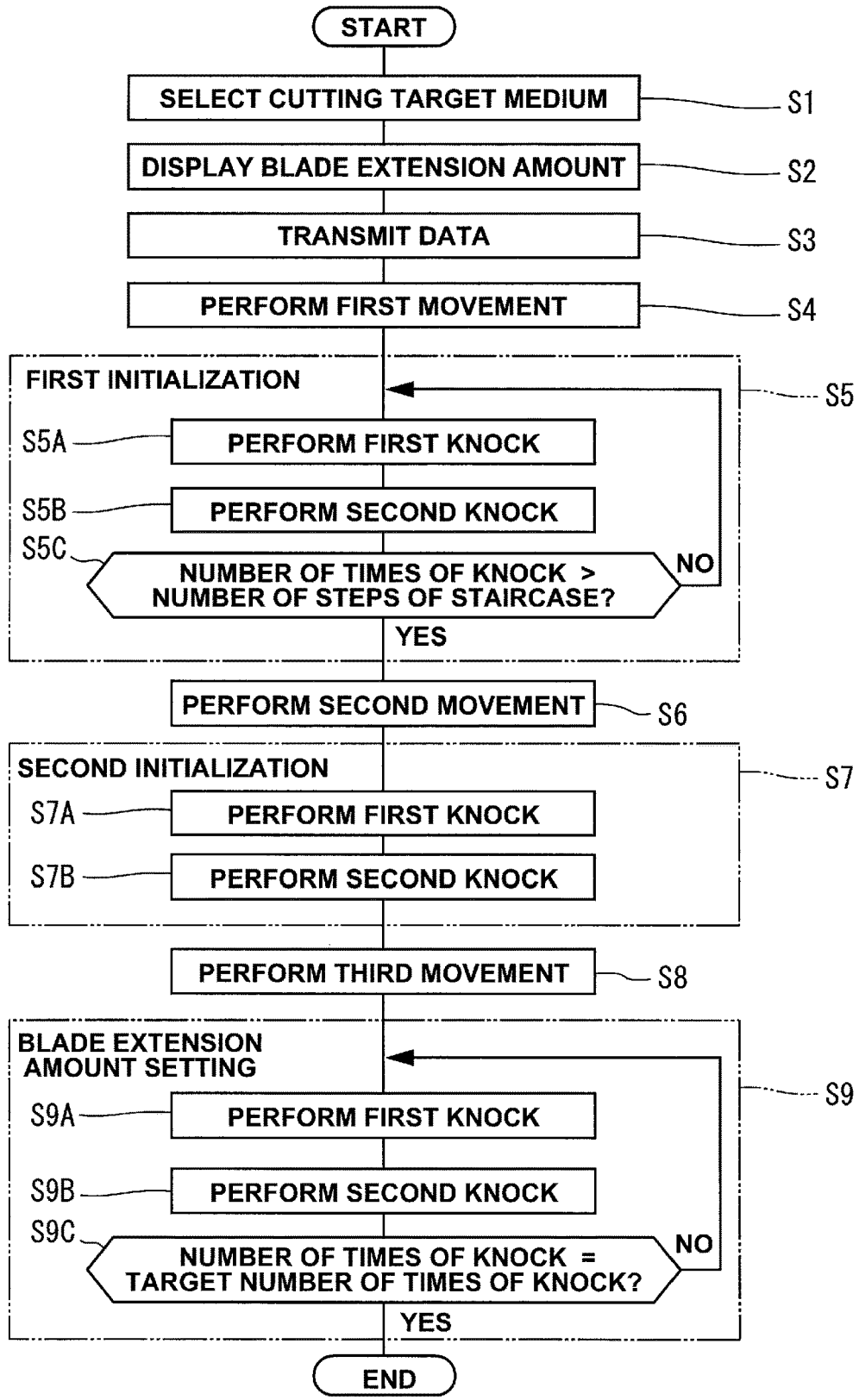
FIG. 19 is a flowchart for explaining a blade extension amount control method of the cutting plotter.

When automatically adjusting the blade extension amount, the cutting pen 2 is attached to the pen carriage 10 of the cutting plotter 1, and the control device 5 of the cutting plotter 1 is connected to the personal computer 43. Data capable of specifying the target blade extension amount is sent from the personal computer 43 to the control device 5. An example of the automatic blade extension amount adjusting operation is shown in the flowchart of FIG. 19.

To set the target blade extension amount, first, in a cutting target medium selection step Si of this flowchart, the user selects the cutting target medium 3. This selection is done using blade extension amount setting application software that operates on the personal computer 43. When the cutting target medium 3 is selected, in a next blade extension amount display step S2, a blade extension amount corresponding to the cutting target medium 3 is displayed to the personal computer 43.

In a next data transmission step S3, data capable of specifying the blade extension amount is sent from the personal computer 43 to the blade extension amount control unit 42 of the control device 5. The blade extension amount control unit 42 controls the operations of the first pressing device 35 and the second pressing device 36 based on the data such that the projection amount of the blade 44 becomes a projection amount corresponding to the thickness of the cutting target medium 3, as will be described later in detail.

After the input of the data, in a first moving step S4, the control device 5 (blade extension amount control unit 42) controls the operation of the second motor 32 to move the pen carriage 10 in the left-and-right direction and locate the cutting pen 2 above the second knock portion 12 at a position facing the second knock portion 12. After that, in a first initialization step S5, the control device 5 controls the operations of the first pressing device 35 and the second pressing device 36 to execute the above-described first knock operation.

In the first initialization step S5, a first knock step S5A and a second knock step S5B in which the moving amount of the cutting pen main body 45 becomes a first moving amount enough to move over one step of the staircase 67, and a determination step S5C are executed.

In the first knock step S5A, the cap portion 75 is pressed against the second knock portion 12, and the cutting pen main body 45 moves to the side of the second knock portion 12 (downward) with respect to the cap portion 75. At this time, the control device 5 controls the operations of the first pressing device 35 and the second pressing device 36 such that a pressing force larger than in cutting is applied to the cutting pen 2.

When the cutting pen 2 is pressed against the second knock portion 12 in this way, the cutting pen main body 45 moves downward with respect to the medium pressing member 61 in a state in which the blade 44 is inserted into the small hole 16, and the stoppers 54 hit the upper surface 7a of the work stage 7. The downward movement of the cutting pen main body 45 is regulated by causing the stoppers 54 to hit the work stage 7. When the cutting pen main body 45 thus moves downward, the medium pressing member 61 moves upward with respect to the cutting pen main body 45 by the length enough to move over one step of the above-described staircase 67.

In the second knock step S5B, the cutting pen main body 45 moves to the opposite side (upper side) of the second knock portion 12 with respect to the cap portion 75. When the entire cutting pen 2 including the cutting pen main body 45 rises up to the initial position, the first knock operation of one time ends.

In the determination step S5C, it is determined whether the number of first knock operations is larger than the number of times corresponding to the number of steps of the above-described staircase 67. The number of first knock operations is the number of times the set of the first knock step S5A and the second knock step S5B is executed. If the number of steps of the staircase 67 is 11, as shown in FIG. 9, the number of times corresponding to the number of steps of the staircase 67 is 10.

If the number of times of knock is larger than the number of steps of the staircase 67, the control device 5 executes a second moving step S6, and then executes a second initialization step S7. In the second moving step S6, the control device 5 controls the operation of the second motor 32 to move the pen carriage 10 in the left-and-right direction and locate the cutting pen 2 above the third knock portion 13 at a position facing the third knock portion 13.

In the second initialization step S7, the control device 5 controls the operations of the first pressing device 35 and the second pressing device 36 to execute the above-described second knock operation. In the second initialization step S7, the set of the first knock step S7A and the second knock step S7B is executed only once. In the first knock step S7A and the second knock step S7B, the moving amount of the cutting pen main body 45 is a second moving amount larger than the first moving amount in the first initialization step S5. The "second moving amount" here is a moving amount that allows the connecting piece 78 to move over the guide surface 66b of the tooth 66 at the highest position of the staircase 67.

In the first knock step S7A, the cutting pen main body 45 moves downward in a state in which the cap portion 75 hits the upper surface 7a of the work stage 7 to regulate the downward movement of the medium pressing member 61. Accordingly, the stoppers 54 are inserted into the long hole 17, and the cutting pen main body 45 lowers larger than in the first knock operation. The downward movement of the cutting pen main body 45 is regulated by making the outer tube 51 hit the work stage 7. For this reason, the distance to move the medium pressing member 61 upward with respect to the cutting pen main body 45 is longer than in the first knock operation.

In the second knock step S7B, the entire cutting pen 2 including the cutting pen main body 45 rises up to the initial position. When the cutting pen 2 rises in this way, the second knock operation ends.

After the end of the second knock operation, the control device 5 executes a third moving step S8 and then executes a blade extension amount setting step S9. In the third moving step S8, the control device 5 controls the operation of the second motor 32 to move the pen carriage 10 in the left-and-right direction and locate the cutting pen 2 above the second knock portion 12 at a position facing the second knock portion 12.

In the blade extension amount setting step S9, the first knock portion is executed as many times as the number of times to obtain the target blade extension amount. The blade extension amount setting step S9 is formed from a first knock step S9A and a second knock step S9B in which the moving amount of the cutting pen main body 45 becomes a moving amount enough to move over one step of the staircase 67, and a determination step S9C.

In the determination step S9C, it is determined whether the number of first knock operations that is the number of times the set of the first knock step S9A and the second knock step S9B is executed equals the target number of times of knock. The target number of times of knock is the number of first knock operations to obtain a blade extension amount corresponding to the thickness of the cutting target medium 3. In the blade extension amount setting step S9, the first knock operation is repetitively performed until the number of first knock operations reaches the target number of times of knock. When the number of first knock operations reaches the number of times of knock, the blade extension amount is adjured, and the control device 5 is set in a standby state.

<Explanation of Effects of Embodiment>

In the cutting pen 2 according to the above-described embodiment, the blade extension amount is defined by the number of reciprocal operations of the medium pressing member 61. The reciprocal operation is executed as a knock operation in which the cutting pen main body 45 approaches the pressed portion in a state in which the cap portion 75 is pressed against the pressed portion, and after that, returns to the initial position. Hence, when the user executes the above-described knock operation as many times as the number of times to obtain the desired blade extension amount, the blade extension amount is correctly adjusted. Hence, according to this embodiment, it is possible to provide a cutting pen in which the blade extension amount is correctly adjusted independently of visual determination of the user.

In this embodiment, a case in which the first knock portion 11, the second knock portion 12, and the third knock portion 13 are used as the pressed portions against which the cap portion 75 is pressed has been described. However, the examples of the pressed portions are not limited to the first knock portion 11, the second knock portion 12, and the third knock portion 13. For example, the user can perform the knock operation by pushing the cap portion 75 by a finger. In this case, the fingertip serves as the pressed portion. Hence, according to the cutting pen 2, the blade extension amount can correctly be adjusted without using the cutting plotter 1.

When using the cutting plotter 1 to adjust the blade extension amount, the knock operation can be performed by pressing the cap portion 75 against the second knock portion 12 or the third knock portion 13 located at the same level as the work stage 7. Hence, when the cutting plotter 1 executes the above-described knock operation as many times as the number of times to obtain the target blade extension amount, the blade extension amount is correctly adjusted. The second knock portion 12 and the third knock portion 13 can be formed using a part of the work stage 7, and therefore, do not interfere with a work of placing/extracting the cutting target medium 3 on/from the work stage 7. Hence, according to the cutting pen 2, the blade extension amount can correctly be adjusted using the cutting plotter 1 with the work stage 7 widely opened independently of visual determination of the user.

According to the blade extension amount control method of the cutting plotter 1 of this embodiment, the first knock step and the second knock step are repetitively executed. Accordingly, the projection amount of the cap portion 75 projecting from the cutting pen main body 45 changes stepwise, and the blade extension amount changes stepwise along with this. Hence, according to this embodiment, it is possible to provide a blade extension amount control method of the cutting plotter 1, which can correctly adjust the blade extension amount by pressing the cutting pen 2 against the second knock portion 12 at the same level as the work stage 7.

The cutting plotter 1 according to this embodiment includes the control device 5 that controls the operations of the first driving device 22 and the second driving device 31, and the first pressing device 35 and the second pressing device 36. The control device 5 includes the blade extension amount control unit 42 that receives data capable of specifying the thickness of the cutting target medium 3 and controls the operations of the first pressing device 35 and the second pressing device 36 based on the data such that the projection amount of the blade 44 becomes a projection amount corresponding to the thickness of the cutting target medium 3. For this reason, the cutting plotter 1 according to the embodiment can automatically set the blade extension amount.

The knock mechanism 63 according to this embodiment includes the rotation member 64, the first spring member 71, and the second spring member 72. The rotation member 64 rotates by a predetermined angle as the reciprocal operation of the medium pressing member 61 in the vertical direction is converted into the rotation operation about the axis C extending in the vertical direction. The position of the rotation member 64 in the vertical direction with respect to the cutting pen main body 45 changes along with the rotation. The first spring member 71 biases the rotation member 64 downward and holds it at the stop position regulated by the cutting pen main body 45. The second spring member 72 biases the medium pressing member 61 to the upper side of the cutting pen main body 45. When the above-described first and second knock operations are performed, the medium pressing member 61 according to this embodiment moves in the vertical direction together with the rotation member 64 in a state in which the medium pressing member 61 is pressed against the rotation member 64 by the spring force of the second spring member 72.

In this embodiment, to change the blade extension amount, the medium pressing member 61 needs to be moved upward with respect to the cutting pen main body 45 by an operation amount equal to or more than the vertical moving amount necessary to rotate the rotation member 64. For this reason, a threshold is substantially provided for the operation amount of the medium pressing member 61 needed to change the blade extension amount, and an unnecessary change of the blade extension amount can be prevented.

The spring force of the first spring member 71 according to this embodiment has a magnitude to regulate the upward movement of the medium pressing member 61 with respect to the cutting pen main body 45 by the cutting operation. For this reason, the blade extension amount never changes unnecessarily at the time of cutting. Hence, the cutting pen 2 according to this embodiment can perform stable cutting.

The cutting pen main body 45 according to this embodiment includes the second tubular portion 50 located on the same axis as the rotation member 64. The plurality of serrated teeth 66 are formed on the second tubular portion 50. Each of the teeth 66 includes the positioning surface 66a and the guide surface 66b. On the medium pressing member 61 according to this embodiment, the plurality of cams 76 arranged in the circumferential direction of the second tubular portion 50 are formed. Each of the cams 76 includes the cam face 76a that gradually tilts to the lower side of the cutting pen main body 45 toward one of the circumferential directions. The rotation member 64 includes the connecting pieces 78 each pressed against the above-described positioning surface 66a from the upper side by the spring force of the first spring member 71 and each having the cam face 76a pressed from the lower side by the force of the second spring member 72.

According to this embodiment, when the above-described first or second knock operation is performed, and the medium pressing member 61 moves upward with respect to the cutting pen main body 45, each connecting pieces 78 moves upward along the guide surface 66b while being pressed by the cam face 76a. When moving over the guide surface 66b, the connecting piece 78 is moved in the circumferential direction of the second tubular portion 50 by a thrust along the positioning surface 66a and the cam face 76a. The source of the thrust is the spring force of the first spring member 71. For this reason, the rotation member 64 is rotated by a driving force having a predetermined magnitude formed from the spring force of the first spring member 71 without being affected by the magnitude of the force applied to the cutting pen 2 in the first and second knock operations. Hence, the cutting pen 2 according to this embodiment has high reliability of the operation of adjusting the blade extension amount by the above-described first and second knock operations.

The stoppers 54 projecting in the vertical direction are provided at one end of the cutting pen main body 45 according to this embodiment. The stoppers 54 abut against the upper surface 7a of the work stage 7 in the second knock portion 12 of the cutting plotter 1 and can be inserted into the long hole 17 of the third knock portion 13. Since the cutting pen 2 according to this embodiment can perform the first knock operation and the second knock operation using the cutting plotter 1, the blade extension amount can be changed by the cutting plotter 1.

In this embodiment, the upper end of the second tubular portion 50 of the cutting pen main body 45 is divided into a plurality of regions in the circumferential direction. The plurality of teeth 66 are provided in each region. In addition, the rotation member 64 according to this embodiment is provided with the plurality of connecting pieces 78 corresponding to the plurality of regions described above, respectively. The rotation member 64 rotates while being supported by the second tubular portion 50 at the plurality of positions in the circumferential direction. For this reason, the rotation member 64 smoothly rotates without tilting with respect to the cutting pen main body 45. Hence, the blade extension amount is smoothly adjusted.

The connecting pieces 78 of the rotation member 64 according to this embodiment are provided at positions facing the inner surface of the cutting pen main body 45. In addition, the through hole 69 long in the rotation direction of the rotation member 64 is formed at a position of the cutting pen main body 45 facing the connecting piece 78. The connecting piece 78 is exposed via the through hole 69 of the cutting pen main body 45. The position of the connecting piece 78 in the rotation direction of the rotation member 64 changes in synchronism with the blade extension amount. Hence, the connecting piece 78 functions as an index representing the blade extension amount by the position in the rotation direction of the rotation member 64. For this reason, the user can confirm the blade extension amount based on the position of the connecting piece 78.

According to the blade extension amount control method of the cutting plotter 1 of this embodiment, the second initialization step S7 is executed after the first initialization step S5, and then, the blade extension amount setting step S9 is executed. Hence, when the blade extension amount control method is executed, the blade extension amount is automatically adjusted without being affected by the blade extension amount of the cutting pen 2 before the start of the blade extension amount adjustment.

In the above-described embodiment, an example in which the staircase 67 formed from the plurality of serrated teeth 66 gradually lowers in the rotation direction of the rotation member 64 has been described. However, the present invention is not limited to this. The staircase 67 can be formed into a shape that gradually rises in the rotation direction of the rotation member 64. If this arrangement is employed, the rotation member 64 is rotated by only the first knock operation, and the blade extension amount changes stepwise.

In the above-described embodiment, an example in which each tooth 66 includes the guide surface 66b extending in the vertical direction has been described. However, the guide surface 66b may tilt. However, if the guide surface 66b tilts in a direction opposite to the positioning surface 66a (tilts upward in one (leftward in FIG. 9) of the circumferential directions of the second tubular portion 50), the length of the cam face 76a in the circumferential direction needs to be larger than the length of the guide surface 66b in the circumferential direction.

In the above-described embodiment, an example in which the present invention is applied to the cutting plotter 1 of a type that moves the cutting target medium 3 in the front-and-rear direction has been described. However, the present invention can also be applied to a so-called flatbed cutting plotter that does not move a cutting target medium. Additionally, in the above-described embodiment, an example in which the work stage 7 is horizontal has been described. However, the work stage 7 may be tilted or vertical. The layout and operation directions of the constituent elements such as the pen carriage 10 and the cutting pen 2 change depending on the direction of the work stage 7.

What is claimed is:

1. A cutting pen comprising:
   a cutting pen main body formed into a tubular shape and including a blade projecting from one end of the cutting pen main body in a longitudinal direction;
   a medium pressing member including a cap portion including a through hole configured to pass the blade, and inserted into the cutting pen main body to be movable in the longitudinal direction in a state in which the cap portion projects from the one end; and a knock mechanism provided in the cutting pen main body and configured to change a position of the medium pressing member in the longitudinal direction with respect to the cutting pen main body stepwise by causing the medium pressing member to repetitively reciprocally move in the longitudinal direction with respect to the cutting pen main body.

2. The pen according to claim 1, wherein the knock mechanism comprises:
a rotation member arranged on a side of the other end of the cutting pen main body with respect to the medium pressing member, and configured to rotate by a predetermined angle when a reciprocal operation of the medium pressing member in the longitudinal direction is converted into a rotation operation about an axis extending in the longitudinal direction and change a position in the longitudinal direction with respect to the cutting pen main body along with the rotation;
a first spring member configured to bias the rotation member to a side of the one end and hold the rotation member at a stop position regulated by the cutting pen main body; and
a second spring member configured to bias the medium pressing member to the side to the other end of the cutting pen main body in the longitudinal direction and press the medium pressing member against the rotation member, thereby moving the medium pressing member in the longitudinal direction integrally with the rotation member.

3. The pen according to claim 2, wherein the first spring member has a spring force of a magnitude to regulate a movement of the medium pressing member to the side of the other end with respect to the cutting pen main body by a cutting operation.

4. The pen according to claim 2, wherein the cutting pen main body includes a cylindrical portion located on the same axis as the rotation member, and
the knock mechanism includes:
a plurality of serrated teeth formed at an end of the cylindrical portion on the side of the other end and arranged in a staircase shape when viewed from a direction orthogonal to the longitudinal direction, each of the plurality of teeth including a guide surface and a positioning surface gradually tilting to the side of the one end in one of circumferential directions of the cylindrical portion;
a plurality of cams formed at an end of the medium pressing member on the side of the other end and arranged in the circumferential direction, each of the plurality of cams including a cam face gradually tilting to the side of the one end in one of the circumferential directions; and
a connecting piece provided on the rotation member, which is pressed from the side of the other end against the positioning surface by a spring force of the first spring member and against which the cam face is pressed from the side of the one end by a spring force of the second spring member.

5. The pen according to claim 4, wherein the guide surface extends in the longitudinal direction.

6. The pen according to claim 4, wherein of the plurality of teeth, a tooth located closest to the side of the one end and a tooth located closest to the side of the other end are adjacent to each other in the circumferential direction.

7. The pen according to claim 4, wherein the cutting pen main body includes a stopper projecting from the one end in the longitudinal direction, a distance in the longitudinal direction between a distal end of the stopper and a distal end of the cap portion that projects from the cutting pen main body and stops is shorter than a distance in the longitudinal direction between an apex of a tooth located closest to the side of the one end of the plurality of teeth and an apex of a tooth located closest to the side of the other end and longer than a distance in the longitudinal direction between apexes of two teeth adjacent to each other, and
the plurality of teeth are formed to be close to the one end in one of the circumferential directions.

8. The pen according to claim 4, wherein the cylindrical portion includes a plurality of regions divided in the circumferential direction,
each of the plurality of regions includes a set of the plurality of teeth, and
the rotation member includes a plurality of connecting pieces provided in correspondence with the plurality of regions, respectively.

9. The pen according to claim 2, wherein the cutting pen main body includes a through hole extending in a rotation direction of the rotation member, and
the rotation member includes an index exposed via the through hole and representing a blade extension amount by a position of the index.

10. A cutting plotter comprising:
a work stage on which a sheet-shaped cutting target medium is placed;
a pen carriage held at a position facing the work stage to be movable along a principal surface of the cutting target medium;
a driving device configured to drive the pen carriage;
a cutting pen supported by the pen carriage to be movable in a direction perpendicular to the principal surface; and
a pressing device provided on the pen carriage and configured to press the cutting pen against the cutting target medium by a predetermined pressing force,
wherein the cutting pen comprises:
a cutting pen main body formed into a tubular shape and including an attached portion attached to the pen carriage and a blade projecting from one end of the cutting pen main body in a longitudinal direction;
a medium pressing member including a cap portion including a through hole configured to pass the blade, and inserted into the cutting pen main body to be movable in the longitudinal direction in a state in which the cap portion projects from the one end; and
a knock mechanism provided in the cutting pen main body and configured to change a position of the medium pressing member in the longitudinal direction with respect to the cutting pen main body stepwise by causing the medium pressing member to repetitively reciprocally move in the longitudinal direction with respect to the cutting pen main body, and
the work stage includes a knock portion including a hole capable of receiving the blade.

11. The plotter according to claim 10, further comprising a control device configured to control operations of the driving device and the pressing device,
wherein the control device includes a blade extension amount control unit configured to receive data capable of specifying a thickness of the cutting target medium and control the operation of the pressing device based on the data such that a blade extension amount that is a projection amount of the blade with respect to the cap portion becomes a projection amount corresponding to the thickness of the cutting target medium.

12. The plotter according to claim 10, wherein the knock mechanism comprises:
   a rotation member arranged on a side of the other end of the cutting pen main body with respect to the medium pressing member, and configured to rotate by a predetermined angle when a reciprocal operation of the medium pressing member in the longitudinal direction is converted into a rotation operation about an axis extending in the longitudinal direction and change a position in the longitudinal direction with respect to the cutting pen main body along with the rotation;
   a first spring member configured to bias the rotation member to a side of the one end and hold the rotation member at a stop position regulated by the cutting pen main body; and
   a second spring member configured to bias the medium pressing member to the side to the other end of the cutting pen main body in the longitudinal direction and press the medium pressing member against the rotation member, thereby moving the medium pressing member in the longitudinal direction together with the rotation member.

13. The plotter according to claim 12, wherein the first spring member has a spring force of a magnitude to regulate a movement of the medium pressing member to the side of the other end with respect to the cutting pen main body by a cutting operation.

14. The plotter according to claim 12, wherein the cutting pen main body includes a cylindrical portion located on the same axis as the rotation member, and
   the knock mechanism includes:
   a plurality of serrated teeth formed at an end of the cylindrical portion on the side of the other end and arranged in a staircase shape when viewed from a direction orthogonal to the longitudinal direction, each of the plurality of teeth including a guide surface and a positioning surface gradually tilting to the side of the one end in one of circumferential directions of the cylindrical portion;
   a plurality of cams formed at an end of the medium pressing member on the side of the other end and arranged in the circumferential direction, each of the plurality of cams including a cam face gradually tilting to the side of the one end in one of the circumferential directions; and
   a connecting piece provided on the rotation member, which is pressed from the side of the other end against the positioning surface by a spring force of the first spring member and against which the cam face is pressed from the side of the one end by a spring force of the second spring member.

15. The plotter according to claim 14, wherein the guide surface extends in the longitudinal direction.

16. The plotter according to claim 14, wherein of the plurality of teeth, a tooth located closest to the side of the one end and a tooth located closest to the side of the other end are adjacent to each other in the circumferential direction.

17. The plotter according to claim 14, wherein the cutting pen main body includes a stopper projecting from the one end in the longitudinal direction,
   a distance in the longitudinal direction between a distal end of the stopper and a distal end of the cap portion that projects from the cutting pen main body and stops is shorter than a distance in the longitudinal direction between an apex of a tooth located closest to the side of the one end of the plurality of teeth and an apex of a tooth located closest to the side of the other end and longer than a distance in the longitudinal direction between apexes of two teeth adjacent to each other, and
   the plurality of teeth are formed to be close to the one end in one of the circumferential directions.

18. The plotter according to claim 17, wherein the knock portion further includes a flat surface with the hole open, against which the cap portion and the stopper abut.

19. The plotter according to claim 17, wherein the knock portion further includes a flat surface with the hole open, against which the cap portion abuts, and
   the hole is formed to be able to further receive the stopper.

20. The plotter according to claim 14, wherein the cylindrical portion includes a plurality of regions divided in the circumferential direction,
   each of the plurality of regions includes a set of the plurality of teeth, and
   the rotation member includes a plurality of connecting pieces provided in correspondence with the plurality of regions, respectively.

21. A blade extension amount control method of a cutting plotter, comprising:
   the moving step of moving, along a work stage, a pen carriage to which a cutting pen including a cutting pen main body with a blade projecting from one end, and a cap portion including a through hole configured to pass the blade and movably held at the one end of the cutting pen main body is attached and positioning the cutting pen at a position facing a knock portion including a hole capable of receiving the blade;
   the first knock step of pressing the cap portion against the knock portion and moving the cutting pen main body to a side of the knock portion with respect to the cap portion;
   the second knock step of moving the cutting pen main body to a side opposite to the knock portion with respect to the cap portion; and
   the step of changing a projection amount of the blade with respect to the cap portion stepwise by repetitively executing the first knock step and the second knock step.

22. The method according to claim 21, further comprising:
   the first initialization step of repetitively executing the first knock step and the second knock step a predetermined number of times such that a moving amount of the cutting pen main body becomes a first moving amount;
   the second initialization step of executing the first knock step and the second knock step only once after the first initialization step such that the moving amount of the cutting pen main body becomes a second moving amount longer than the first moving amount; and
   the blade extension amount setting step of executing the first knock step and the second knock step as many times as the number of times to obtain a blade extension amount corresponding to a thickness of a cutting target medium after the second initialization step.

* * * * *